United States Patent [19]

Piper et al.

[11] Patent Number: 4,955,027
[45] Date of Patent: Sep. 4, 1990

[54] WAVELENGTH LOCKED LASER LIGHT SOURCE

[75] Inventors: James A. Piper, Pennant Hills; Mark D. Ainsworth, Lane Cove, both of Australia

[73] Assignee: MacQuarie University, North Ryde, Australia

[21] Appl. No.: 257,291

[22] PCT Filed: Feb. 11, 1988

[86] PCT No.: PCT AU88/00040
§ 371 Date: Sep. 30, 1988
§ 102(e) Date: Sep. 30, 1988

[87] PCT Pub. No.: WO88/06358
PCT Pub. Date: Aug. 25, 1988

[30] Foreign Application Priority Data

Feb. 11, 1987 [AU] Australia ............................ PI0297

[51] Int. Cl.⁵ .............................................. H01S 3/098
[52] U.S. Cl. ............................................. 372/18; 372/53; 372/30; 372/32; 372/94; 372/97
[58] Field of Search .................... 372/18, 53, 93, 94, 372/97, 30, 71, 70, 72, 25, 32

[56] References Cited

U.S. PATENT DOCUMENTS

| | | | |
|---|---|---|---|
| 3,754,195 | 8/1973 | Johnston, Jr. et al. | 372/71 |
| 3,766,489 | 10/1973 | Rosenberg et al. | 372/18 |
| 4,019,157 | 4/1977 | Hutchinson et al. | 372/18 |
| 4,410,995 | 10/1983 | Chiu | 372/53 |
| 4,689,794 | 8/1987 | Brosnan | 372/18 |

FOREIGN PATENT DOCUMENTS 493113 5/1977 Australia .
87/0021 11/1987 World Int. Prop. O. .

OTHER PUBLICATIONS

Bradley; "High Power Pulsed Lasers"; Sci. Prog., Oxf.; vol. 57; 1969; pp. 301-322.
Carney et al; "Injection-Locked-Xenon-ion Laser"; IEEE Journal of Quan. Elec., vol. QE-16, No. 1; 01/1980; pp. 9-10.
Yasa et al., "Reciprocal Passive-AR+ Pump Laser"; Optics Letters, vol. 6, No. 2; 01/1981; pp. 67-69.
Hopkins and Rentzepis, *Apl Phys Lett*, vol. 47, No. 8, pp. 776 to 778, Oct. 1985.

Primary Examiner—Frank Gonzalez
Attorney, Agent, or Firm—Berman, Aisenberg & Platt

[57] ABSTRACT

A low-power, continuous wave laser beam is injected into the optical cavity of a high gain, high power, short pulsed laser. The output beam features excellent power and wavelength stability.

24 Claims, 3 Drawing Sheets

WAVELENGTH LOCKED LASER LIGHT SOURCE

TECHNICAL FIELD

This invention relates to a wavelength locked pulsed dye laser system and a method of operating a pulsed dye laser system to provide a wavelength locked pulsed laser light.

BACKGROUND ART

There are a wide variety of fields which utilise laser light. A particular application is in the treatment of human cancer tumours. It has been established that illumination of tumours previously labelled with suitable photoactive substances (for example, HPD - haematoporphyrin derivative) is an effective method of treating such tumours. The wavelength (colour) of the illumination light must be such that interaction with the photoactive substance occurs while at the same time adequate penetration of the tissue is permitted. In the case of the drug HPD, for example, photoactivity occurs for wavelengths in a narrow band ($\pm 5$ nm) centred at 630 nm while good transmission of light through haemoglobin and thus through the tissue is obtained for wavelengths greater than 600 nm.

Both continuous and pulsed light have been used for the above purpose. Continuous light sources employed to date have been conventional arc discharge lamps of high intensity used with appropriate filters or a continuous dye laser pumped by an argon ion laser. Pulsed light of the desired wavelength and average power can be obtained using a gold vapour laser, which operates directly within the required band at 628 nm or a pulsed dye laser pumped by a pulsed copper laser and whose wavelength is tuned in the required band. Given that fibre-optics are required to deliver the light to tumour sites within the body, laser sources are preferred over conventional sources (for the puposes of efficient coupling of light into the fibres). Moreover there is evidence that pulsed lasers are superior to continuous lasers in therapeutic effect.

Continuous dye lasers pumped by argon ion lasers have been found to have considerable disadvantages in practice for the above application. These systems are complex requiring delicate alignment which can alter over time and are therefore unreliable for routine use; they are also very expensive to install and maintain and electrically extremely inefficient.

The gold vapour laser, though generating emission directly within the required band at the appropriate energy densities, also has significant disadvantages in practice. The very high operating temperatures, greater than 1750° C., required of the plasma tube place great stress on the construction materials; the low energy conversion efficiency (compared with the copper vapour laser) results in stress on the high-voltage electrical excitation circuitry and components and places added requirements on cooling facilities; and the laser material (gold) is expensive in the quantities required. All these factors combine to make the gold laser also unreliable in operation and expensive to install and maintain.

Pulsed dye lasers based on the pulsed copper laser as a pump source have considerable advantages over both the argon-pumped dye laser and the gold vapour laser. In the first place the copper laser pump source itself is a practical and reliable device (with plasma tube operating temperatures only about 1500° C.), relatively cheap to install and maintain and having good electrical energy conversion efficiency. Second, the efficiency of conversion of the copper laser pump power (at wavelengths in the green and yellow) to high-pulse-rate dye laser output (at wavelengths in the orange, red and infrared) is high, up to 50%, in direct conversion amplifiers. However to achieve such high conversion efficiencies a dye amplifier must be injected with an optical signal at the appropriate wavelength within the amplification band of the dye and with sufficient initial power. Such an injection signal is normally provided by a dye oscillator also optically pumped with a portion of the copper laser pump power. Copper-laser-pumped dye oscillators are themselves relatively inefficient ($<15\%$) in converting the pump laser power to dye oscillator output. The optical arrangements of dye oscillators are usually complex including a loss causing frequency-selective element (often a diffraction grating) as part of the optical cavity, and, in many cases, additional optical components (lenses or prisms) to expand the optical beam at the grating. Although such dye oscillators have the advantage that the operating wavelength is tunable over the amplification band of the dye used in the oscillator, the tolerance to misalignment can be low and, in applications where a fixed operating wavelength is required, wavelength and power stability are difficult to achieve. Moreover the optical quality of such dye oscillator output beams is low, often requiring very inefficient beam clean-up techniques to be applied before injection into the subsequent dye amplifier(s).

It follows from above that there is a need for a wavelength locked pulsed laser light source where the wavelength of the laser light is near 630 nm. It is the object of the invention to provide a wavelength locked pulsed laser with high average power at good overall efficiencies ($>20\%$) and with low beam divergence ($<1$ mrad).

DISCLOSURE OF INVENTION

The present inventors have discovered that the wavelength of pulsed laser light emitted from high average power copper laser pumped pulsed dye lasers can be efficiently ($>90\%$) locked at the wavelength of laser light from a low-power ($<5$ mW) continuous wave laser directed into the optical cavity of the dye laser. This result is novel since it has been previously shown that low-power continuous laser light directed into high gain short pulse ($<50$ nsec) dye laser optical cavities is ineffective in locking the wavelength or controlling beam characteristics of the pulsed laser light emitted from the dye laser under conditions appropriate to efficient energy conversion in the dye laser. (It has been reported previously that locking efficiencies up to 50% can be achieved only for very low energy conversion efficiencies $<1\%$ for short optical pulses of $<50$ nsec). The reason for this is that the spontaneous fluorescent emission from the dye pumped by short ($<50$ nsec) pulses of high peak power ($>10$ kW) is comparable to the injected intensity from the low power continuous laser.

In the first embodiment of this invention there is provided a wavelength locked pulsed dye laser system which comprises a low-power continuous wave laser disposed to inject continuous wave, single wavelength, laser light emitted therefrom into the optical cavity of a pulsed dye laser whereby the wavelength of pulsed laser light emitted from the dye laser is locked at the wavelength of the continuous wave, single wavelength, laser light.

In a second embodiment of this invention there is provided a method of operating a pulsed dye laser system to provide a wavelength locked pulsed laser light which method comprises providing a low-power continuous wave laser and a pulsed dye laser and aligning the lasers relative to each other such that a continuous wave, single wavelength, laser light emitted from the continuous wave laser is injected into the optical cavity of the pulsed dye laser whereby the wavelength of pulsed laser light emitted from the dye laser is locked at the wavelength of the laser light injected into the optical cavity.

The power of the continuous wave laser can be significantly lower than the power of the pumping light of the pulsed dye laser, e.g. a continuous wave He-Ne laser of less than 5 milliwatts power has been used to lock the wavelength of a dye laser employing rhodamine 640 or rhodamine 640 - rhodamine 590 mixtures or DCM as the fluorescent dyes and a 4 W copper laser input pumping light. Preferably the continuous wave laser is from 0.1 mW to 10 mW and the pulsed dye laser is pumped by a 0.5 W to 10 W copper vapour laser.

While the invention is particularly described below with reference to a dye laser employing rhodamine 640, Kiton Red 620 dye, rhodamine 590, rhodamine 640 - rhodamine 590 mixtures or DCM as the dye laser medium optically pumped by the green ($\lambda = 510.6$ nm) and/or yellow ($\lambda = 578.2$ nm) emissions from a high-pulse-rate copper vapour laser and locked to the wavelength ($\lambda = 632.8$ nm) of a low-power continuous-wave (cw) helium-neon laser, it is not limited to these particular (pump or locking) laser wavelengths. In particular, the invention includes situations such as (i) high-pulse-rate, short-pulse pulsed laser pump sources other than the copper vapour laser including other pulsed metal vapour laser such as gold, manganese or lead vapour lasers, or the metal atom recombination lasers such as strontium and calcium ion lasers, or any other high-pulse-rate lasers; (ii) low power (0.1 milliwatt<power<5 milliwatt depending on power of pulsed dye laser) lasers other than the helium-neon laser for wavelength-locking purposes including metal ion lasers such as the cadmium, zinc, mercury, or selenium ion lasers, or low-power noble-gas ion lasers such as argon or krypton ion lasers, or semi-conductor diode lasers, or any other low-power continuous-wave lasers. It is noted that continuous wave lasers of power >5 milliwatt can also be used in the first and second embodiments of this invention.

The locked pulsed laser light can be injected into a dye amplifier(s) to increase its power to a preselected level.

In the present invention the wavelength locking is achieved using a low power continuous laser, the optical cavity of which is coupled to the dye cavity in close proximity. The reflectivity/transmission profiles of the mirrors defining the optical cavity of the pulsed dye laser are chosen to suppress laser emission at wavelengths other than those close to the wavelength of the continuous low power injection laser. In addition, some optical dispersion in the dye laser cavity is provided for to aid suppression of unwanted wavelengths.

The separation of mirrors defining the optical cavity of the pulsed dye laser is small.

The laser light from the continuous wave laser can be polarised or unpolarised.

The wavelength locked pulsed laser light source can include a continuous wave laser which is a 0.5 mW to 5 mW helium-neon laser, the pulsed dye laser employs a rhodamine 640, rhodamine 590, DCM, rhodamine 640 - rhodamine 590 mixture or Kiton Red 620 dye and the pulsed dye laser is pumped by a 2 W-5 W copper vapour laser.

The invention provides locking of pulsed laser light emitted from a pulsed dye laser of short pulse duration (<50 ns) to the wavelength of laser light emitted from a continuous wave laser into the optical cavity of the dye laser and giving stable efficient conversion of optionally high-pulse-rate short-pulse, high peak power pum laser power (at the pump wavelength) to optionally high-pulse-rate, short-pulse, high peak power dye laser output power (at the locked wavelength) with high optical beam quality. Further, alignment of the dye laser mirrors is relatively easy to reproduce as alignment can be simplified to a one mirror adjustment. The high optical quality of the frequency-locked output beam which stems from the high optical quality of the low-power locking laser beam is demonstrably superior to the output beam quality of conventional (tunable) pulsed dye lasers.

In terms of one of the applications envisaged for the invention (viz. HPD cancer phototherapy) the present invention based on a copper laser-pumped dye laser locked to the wavelength ($\lambda = 632.8$ nm) of the He-Ne laser has considerable operational advantages over the alternative laser systems as described above.

BRIEF DESCRIPTION OF DRAWINGS

Preferred embodiments of the invention are now described, with reference to the following drawings in which.

MODES FOR CARRYING OUT THE INVENTION

Figure 1:
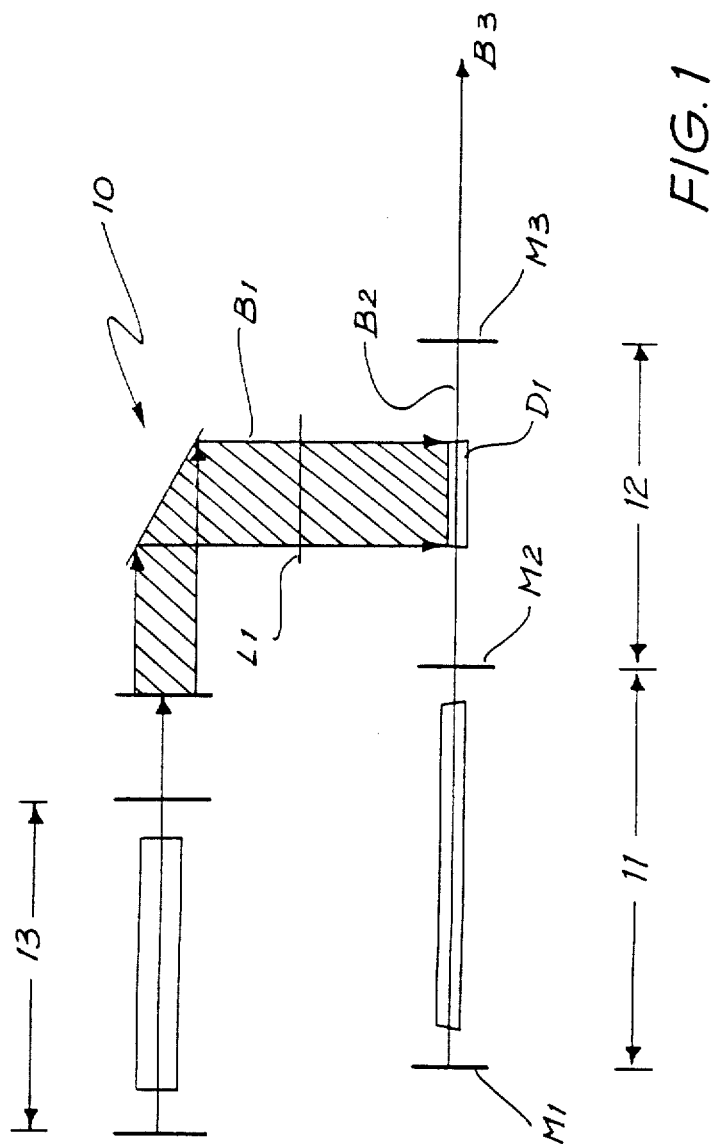
FIG. 1 is a schematic depiction of a pulsed dye laser pumped by a short-pulse high-peak power laser source and a continuous wave laser disposed to inject continuous wave, single wavelength, laser light emitted therefrom into the optical cavity of the pulsed dye laser.

Referring to FIG. 1 a wavelength locked pulsed dye laser light system 10 includes a He-Ne continuous wave laser 11 which is disposed to inject continuous wave, single wavelength ($\lambda = 632.8$ nm) laser light emitted therefrom into the optical cavity 12 of a pulsed dye laser.

Incoming pump beam B1 from copper vapour laser 13 containing green ($\lambda = 510.6$ nm) and/or yellow ($\lambda = 578.2$ nm) wavelengths is line-focussed by cylindrical lens L1 (or a combination of cylindrical and spnerical lensas) onto dye cell D1 in a direction transverse (that is, perpendicular) to the optical axis of cavity 12. Dye cell D1 contains a flowing solution of a suitable fluorescent laser dye such as rhodamine 590, rhodamine 640 (or mixtures of the two), Kiton Red 620, DCM or other appropriate dyes or dye mixtures. He-Ne laser 11 and its end-cavity mirrors M1 and M2 are aligned with the optical axis of cavity 12. Mirror M2 may be wedged to introduce dispersion into the cavity. Mirror M3 which partially reflects output beam B2 of He-Ne laser 11 is accurately aligned normal to B2 so that mirror M3 forms part of a three-mirror cavity for He-Ne laser 11 (along with M1 and M2). When He-Ne laser beam is not present (that is, He-Ne laser 11 is turned off) cavity 12 emits a laser beam at B3 with a broad spectrum characteristic of the amplification properties of the dye and the reflection properties of M2 and M3 and any dispersion in the cavity. When, however, the He-Ne laser beam is present in cavity 12 (He-Ne laser 11 is turned on), the output wavelength at B3 of cavity 12 becomes locked to that of He-Ne laser 11 (at $g = 632.8$ nm) with high spectral purity. The distance between M2 and M3 is a critical parameter for optimum performance as is the power of He-Ne laser 11 in determining the spectral purity and stability. Such cavity lengths as 70 to 300 mm are typical though others are allowed. The polarisation of He-Ne laser beam B2 can be unpolarised or linearly polarised; in the latter case the plane of polarisation can be parallel or normal to pump beam direction B1. The transmission of mirrors M2 and M3 are typically 0.5–2.0% and 10–80% respectively at $\lambda = 632.8$ nm; other transmissions are allowed for. The dye cell itself may be wedged to provide further optical dispersion in the dye laser cavity.

Figure 2:
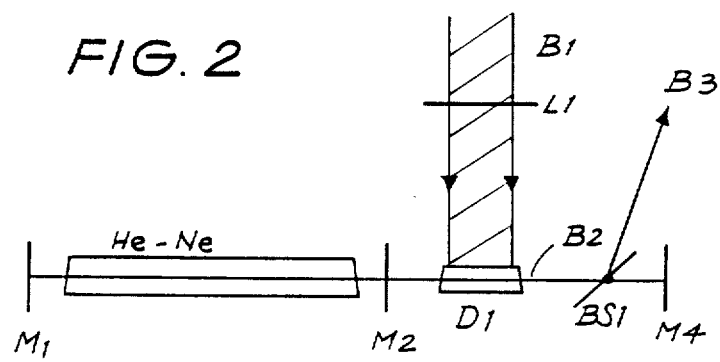
FIG. 2 is a schematic depiction of the arrangement of FIG. 1 except that mirror M4 is a totally reflecting mirror and a beamsplitter BS1 is located within the optical cavity of the dye laser.

In FIG. 2 partially reflecting (transmitting) mirror M3 of FIG. 1 is replaced by a totally reflecting mirror M4 and output beam B3 from the dye laser taken from a variable coupling-plate or beamsplitter BS1 within the dye laser cavity between M2 and M4.

Figure 3:
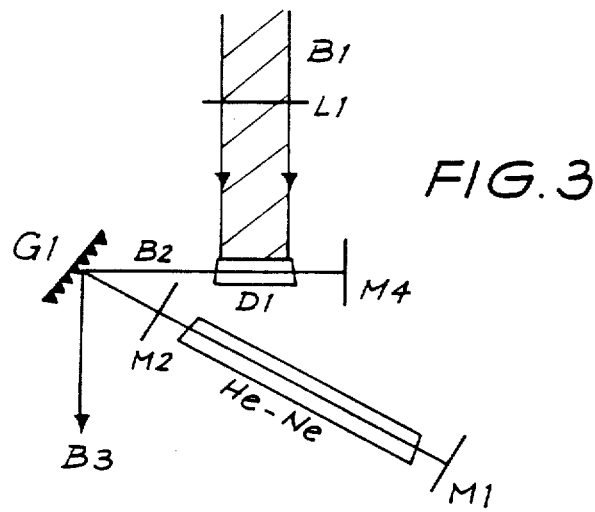
FIG. 3 is a schematic depiction of the arrangement of FIG. 1 except that mirror M4 is a totally reflecting mirror and a grating G1 is located within the optical cavity of the dye laser.

In FIG. 3 an additional component, grating G1, is added to the dye laser cavity between M2 and M4; grating G1 is oriented so that the first (or higher) order diffraction of He-Ne beam B2 is colinear with the dye laser optical axis. Output beam B3 of the dye laser is taken from the grating as the zeroth (or other) diffraction order. Other arrangements of gratings or alternative dispersive elements including a prism or prisms are envisaged, in particular the replacement of mirror M4 in FIG. 2 with a broadband-reflecting Littrow prism.

Figure 4:
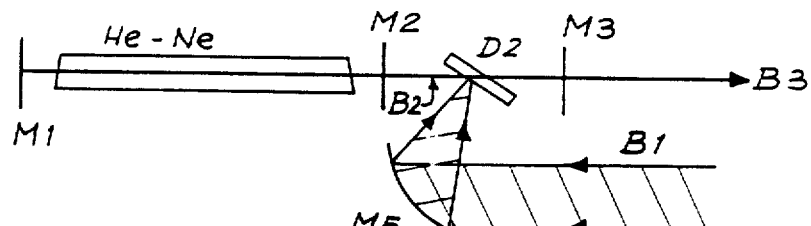
FIG. 4 is a schematic depiction of the arrangement of FIG. 1 except that the dye pumping laser is focussed by a spherical mirror or lens to a spot on a fast flowing dye stream.

In FIG. 4 the transverse pumping arrangement is replaced by a longitudinal pumping arrangement where the input (copper laser) pump beam is focussed by a spherical mirror or lens to a spot on a fast flowing dye stream (in a closed cell or free jet) oriented at Brewsters angle to the dye laser optical axis. The dye laser cavity is otherwise unaltered from that of FIG. 1. Alternative arrangements of the dye laser cavity such as are illustrated in FIGS. 2 and 3 but employing longitudinal pumping as in FIG. 4 are envisaged.

Figure 5:
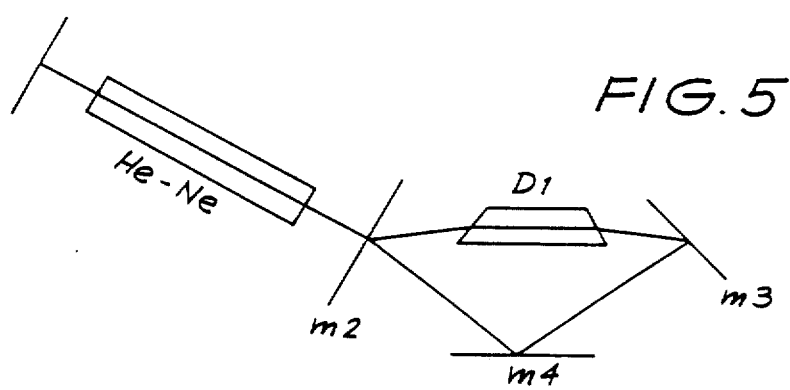
FIG. 5 is a schematic depiction of the arrangement of FIG. 1 except a ring cavity, rather than standing wave cavity is used.

In FIG. 5, the standing wave cavity (FIGS. 1→4) is replaced by a ring cavity comprising mirrors M2, M3 and M4. The He-Ne injection locking signal is coupled into the cavity through mirror M2 (also the output coupler of the He-Ne laser) and the output from the locked oscillator extracted for either M3 or M4. Other arrangements incorporating additional mirrors, mirror and prism or prism cavities are envisaged.

Figure 6:
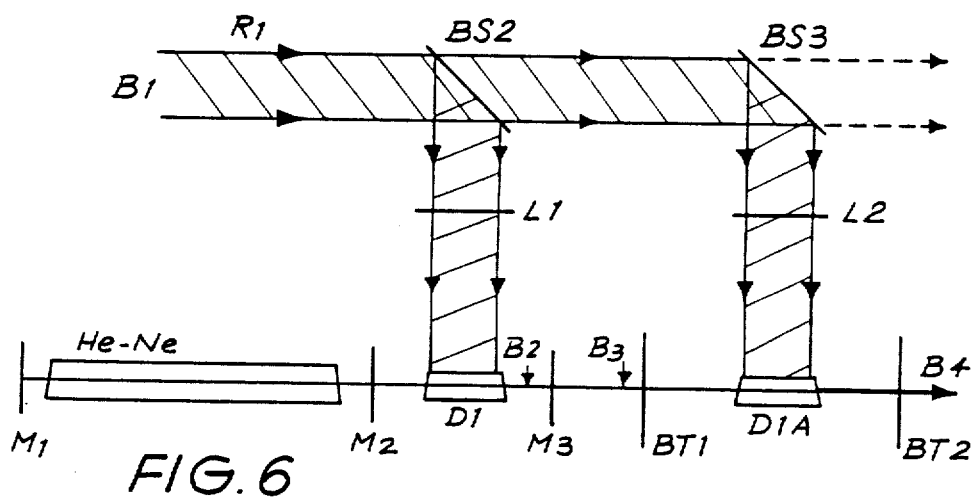
FIG. 6 is a schematic depiction which includes the arrangement of FIG. 1 in combination with a dye laser amplifier.

FIG. 6 shows the dye laser oscillator as illustrated in FIG. 1 employed in conjunction with dye amplifiers (oscillator cavities such as those of FIGS. 2–4 may be substituted for that of FIG. 1). The input (copper laser) pump beam is split at beamsplitter BS2, a fraction of the beam being redirected to the dye oscillator as for FIG. 1. The remaining pump beam passes to beamsplitter BS3 where a further fraction is redirected to dye amplifier D1A, via focussing optics L2. The dye amplifier contains a flowing solution of a fluorescent dye or dye mixture as described for the dye oscillator. Output beam B3 of the dye oscillator passes through beam transfer optics BT1 (which might include apertures, lens or dispersing elements or a combination of such as is required to effect any desirable "clean-up" of the oscillator beam) to the dye amplifier and emerges as a power-amplified beam at B4. This amplified beam may be employed directly or further amplified after passage through beam transfer optics BT2 to an additional dye amplifier stage.

As an example, for a 4 Watt copper laser input pump beam, some 30% or about 1–1.5 W may be employed to pump the fixed-wavelength oscillator generating approximately 0.1 W at $\lambda = 632.8$ nm from the oscillator. Injection of this output beam into an amplifier, pumped by the remaining 2.5–3 W of the copper laser pump beam results in amplification by a factor of typically ten to generate a 1 Watt output beam (B4) at $\lambda = 632.8$ nm at overall conversion efficiency 25% from the original copper laser pump beam. Alternatively, a single-step conversion efficiency near 20% may be obtained from a single frequency locked dye oscillator pumped with 3–4 Watts direct input. Note that arrangements similar to that of FIG. 6 but where the dye amplifiers are pumped transversely from both sides are also envisaged.

A feature of the output beams generated by the devices described herein is excellent power and wavelength stability in high-average-power, high-pulse rate operation.

We claim:

1. In a wavelength locked pulsed laser system, the improvement comprising a low-power continuous wave laser disposed to inject a continuous wave, single wavelength, laser light emission therefrom into an optical cavity of a high power short pulse dye laser, the dye laser being transversely pumped by a beam line-focussed with respect to the continuous wave emission, the optical cavity of the pulsed dye laser further comprising a short cavity bounded by first and second mirrors aligned normal to a central axis, the mirrors having a coating for suppressing laser emissions of wavelengths other than those close to the continuous wave, single wavelength emission, whereby the wavelength of pulsed laser light emitted from the dye laser is locked at the wavelength of the continuous wave, single wavelength, laser light.

2. The laser light system as defined in claim 1 wherein the continuous wave laser further comprises a second optical cavity which is coupled to the cavity of the dye laser in close proximity and wherein the continuous wave laser is selected from the group consisting of helium-neon laser, cadmium ion laser, zinc ion laser, mercury ion laser, selenium ion laser, argon ion laser and krypton ion laser.

3. The laser light system as defined in claim 2 wherein the continuous wave laser is a helium-neon laser.

4. The laser light system as defined in claim 2 wherein the continuous wave laser is from 0.1 mW to 10 mW.

5. The laser light system as defined in claim 1 wherein the pulsed dye laser employs rhodamine 640, Kiton Red 620 dye, rhodamine 590, rhodamine 640 - rhodamine 590 mixtures or DCM as fluorescent dye.

6. The laser light system as defined in claim 5 wherein the pulsed dye laser is pumped by a pumping laser selected from copper vapour laser, gold vapour laser, manganese vapour laser, lead vapour laser strontium ion laser and calcium ion laser.

7. The laser light system as defined in claim 6 wherein the pulsed dye laser is pumped by a laser having a pulse duration of less than 50 nanoseconds and a high peak power of more than 10 kW.

8. The laser light system as defined in claim 1 wherein the continuous wave laser is a 0.5 mW to 5 mW helium-neon laser, the pulsed dye laser employs a rhodamine 640, thodamine 590, DCM, rhodamine 640 - rhodamine 590 mixture or Kiton Red 620 dye and the pulsed dye laser is pumped by a copper vapor laser having a pulse duration of less than 50 nanoseconds and a high peak power of more than 10 kW.

9. In a wavelength locked pulse laser system, the improvement comprising a low-power continuous wave laser disposed to inject a continuous wave, single wavelength, laser light emission therefrom into an optical cavity of a high power short pulse dye laser, the optical cavity of the pulsed dye laser further comprising a short cavity bounded by first and second mirrors aligned normal to a central axis, the mirrors suppressing laser emissions at wavelengths other than those close to the continuous wave, single wavelength emission, whereby the wavelength of pulsed laser light emitted from the dye laser is locked at the wavelength of the continuous wave, single wavelength, laser light.

10. The laser light system as defined in claim 9, wherein the continuous wave laser further comprises a second optical cavity which is coupled to the cavity of the dye laser in close proximity thereto and wherein the continuous wave laser is selected from the group consisting of helium-neon laser, cadmium ion laser, zinc ion laser, mercury ion laser, selenium ion laser, argon ion laser and krypton ion laser.

11. The laser light system as defined in claim 10 wherein the continuous wave laser is a helium-neon laser.

12. The laser light system as defined in claim 10 wherein the power of the continuous wave laser is from 0.1 mW to 10 mW.

13. A laser light system as defined in claim 9 wherein the pulsed dye laser employs rhodamine 640, Kiton Red 620 dye, rhodamine 590, rhodamine 640-rhodamine 590 mixtures or DCM as fluorescent dye.

14. The laser light system as defined in claim 13 wherein the pulsed dye laser is pumped by pumping laser selected from copper vapor laser, gold vapor laser, manganese vapor laser, lead vapor laser, strontium ion laser and calcium ion laser.

15. The laser light system as defined in claim 14 wherein the pulsed dye laser is pumped by a laser having a high peak power of more than 10 KW and a pulse duration of less than 50 nanoseconds.

16. The laser light system as defined in claim 9 wherein the continuous wave laser is a 0.5 mW to 5 mW helium-neon laser, the pulsed dye laser employs a rhodamine 640, rhodamine 590, DCM, rhodamine 640-rhodamine 590 mixture or Kiton Red 620 dye and the pulsed dye laser is pumped by a copper vapor laser having a pulse duration of less than 50 nanoseconds and a high peak power of more than 10 KW.

17. The laser system as defined in claim 9 wherein the dye laser is pumped longitudinally with respect to the continuous wave, single wavelength emission.

18. The laser system as defined in claim 17 wherein the dye laser is point-focused to the central axis.

19. A method of producing a wavelength locked, pulsed, laser emission comprising the steps of:
   emitting a first high power short pulse beam;
   emitting a second low-power continuous wave beam;
   focusing the first beam to a line;
   projecting the focused first beam transversely to the second beam and onto it and onto a stream of laser dye which is disposed between two mirrors which define a short, straight optical cavity having a central optical axis which passed through the first beam;
   projecting the second beam along the central optical axis; and
   suppressing the emission from the optical cavity of wavelength, other than the wavelength of the second beam.

20. A method of producing a wavelength locked, pulsed, laser emission comprising the steps of:
   emitting a first high power short pulse beam;
   emitting a second low-power continuous wave beam;
   projecting the first beam onto the second beam and onto a stream of laser dye which is disposed between two mirrors which define a short, straight optical cavity having a central optical axis which passed through the first beam;
   projecting the second beam along the central optical axis; and
   suppressing the emission from the optical cavity of wavelength, other than the wavelength of the second beam.

21. The method of claim 19 wherein the pulse duration of the first beam is less than 50 nS, the high peak power of the first beam is more than 10 kW and the power of the second beam is less than 5 mW.

22. The method of claim 20 wherein projecting the first beam on the second beam and onto a stream of laser dye further comprises projecting the first beam longitudinally with respect to the second beam.

23. The method of claim 20 wherein projecting the first beam further comprises point-focusing the first beam onto the second.

24. The method of claim 20 wherein the pulse duration of the first beam is less than 50 nS, the high peak power of the first beam is more than 10 kW and the power of the second beam is less than 5 mW.

* * * * *